Sept. 15, 1936.     N. C. STOREY     2,054,608
TRACTOR HOIST
Filed Dec. 5, 1934     2 Sheets-Sheet 1
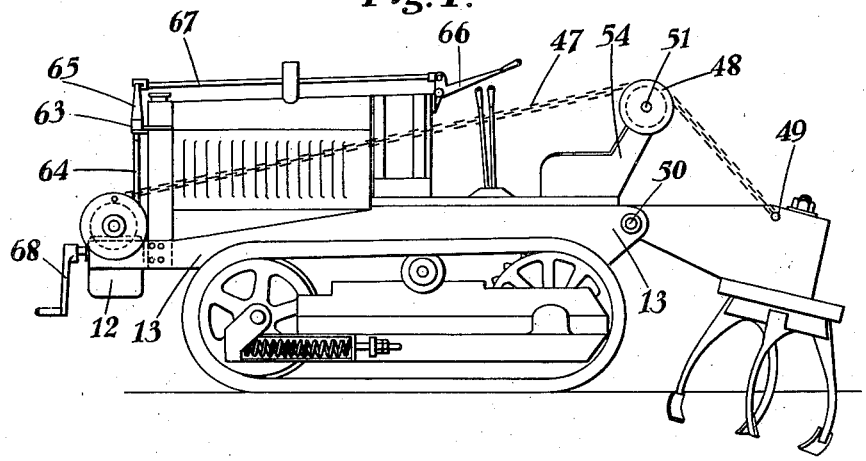
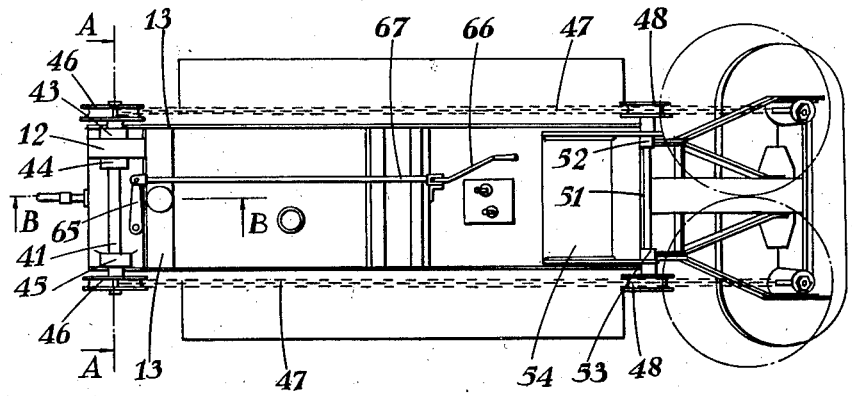
INVENTOR.
NORMAN CHOATE STOREY.
BY
ATTORNEY.

Sept. 15, 1936.  N. C. STOREY  2,054,608
TRACTOR HOIST
Filed Dec. 5, 1934  2 Sheets-Sheet 2
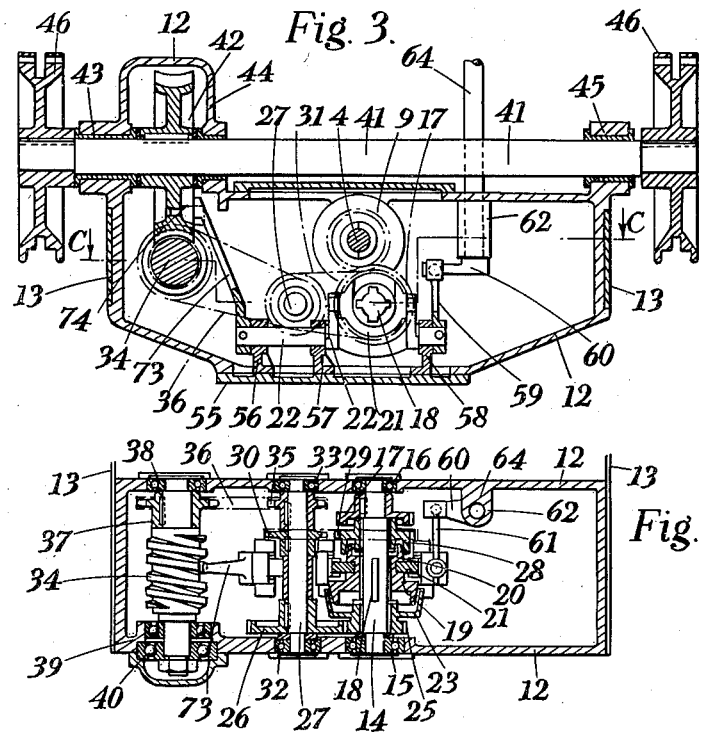
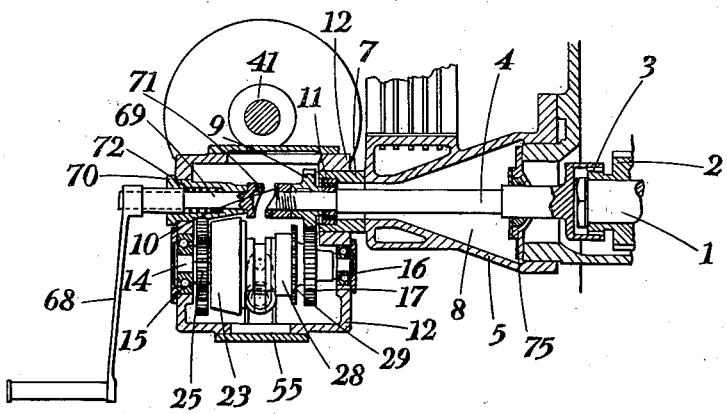
INVENTOR.
NORMAN CHOATE STOREY.
BY
ATTORNEY.

Patented Sept. 15, 1936

2,054,608

UNITED STATES PATENT OFFICE 2,054,608

TRACTOR HOIST

Norman Choate Storey, Leeds, England

Application December 5, 1934, Serial No. 756,171
In Great Britain May 4, 1934

10 Claims. (Cl. 97—50)

This invention comprises a power driven hoist to be mounted on the forward part of a tractor, and receiving its driving power from the forward end of the tractor motor shaft, its usual purpose being for lifting and lowering tilling implements or other equipment attached to the rear of the tractor. It also comprises irreversible hoisting means mounted on said tractor and a reversible drive from the tractor's motor to the said irreversible hoisting means.

The advantages of this implement hoist are, that by its installation on the forward part of the tractor it acts as a counterbalance or partial counterbalance for tilling implements mounted on the rear of the tractor, and by taking the drive from the forward end of the motor of the tractor the drive is independent from the other driven parts of the tractor. It is also distinguished by its simplicity and ease of attachment or detachment.

In the accompanying drawings illustrative of one form of the invention:—

Figure 1 is a side view of a crawler type tractor, carrying my improved hoisting device.

Fig. 2 is a plan view of the structure shown in Fig. 1.

Fig. 3 is a sectional view taken on line A—A of Fig. 2.

Fig. 4 is a sectional view taken on line C—C of Fig. 3.

Fig. 5 is a sectional view taken on line B—B of Fig. 2.

In describing the various parts and connections shown in the accompanying drawings, 1 is the forward end of the tractor's crank shaft, 2 is the tractor's timing gear wheel a part of which is the driving dental clutch 3 for driving shaft 4. Bolted on to the front of the tractor radiator tank 5 by bolts 6 is the flanged spigot 7 (see Fig. 6). On the same axial center line with the tractor's crank shaft 1, the shaft 4 with the gear 9 and hand starting clutch member 10 fixed on the forward end, is carried in bearing 11. The gear case 12 which encloses the power transmitting mechanism of the hoist, is held central with the drive shaft 4 by fitting over spigot 7 and is supported and carried directly in front of the tractor's radiator by side plates 13. The shaft 14, carried in bearings 15 and 16, is driven by gear 17 from gear 9 and drives from its splined center 18 the double male part of the cone clutches 19 and 20 which said part is shifted by yoke 21 and fork 22. Female clutch member 23 which engages with clutch 19 is rotatably mounted on shaft 14 and is made integral with or connected to gear 25 which meshes with gear 26 keyed to shaft 27 and female clutch member 28 which engages with clutch 20 is also rotatably mounted on shaft 14 and is made integral with or connected to sprocket 29 and drives sprocket 30 through chain 31 (see dotted line, Fig. 3). Shaft 27 is carried in bearings 32 and 33 and drives the worm 34 through sprocket 35, chain 36 and sprocket 37. The worm 34 which is of irreversible design is carried and supported by bearings 38, 39 and thrust bearing 40. The hoist shaft 41 on to which is keyed the worm wheel 42 meshing with the worm 34, is carried in bearings 43, 44 and 45 and has hoisting chain drums 46 keyed on its ends. Connected to and arranged to wind on to the chain drums 46 are hoisting chains 47 passing over pulleys 48 and connected at 49 to the implement assembly which is hinged to the rear of the tractor at 50. The pulleys 48 are carried on shaft 51 in bearings 52 and 53 fastened to the rear of the driver's seat 54. The bottom cover plate 55 of the case 12 is fitted with bearings 56, 57, and 58 in which is mounted the clutch shifter fork 22 having fixed on one end the lever 59 which is connected to lever 60 by connecting rod 61. Mounted in the bearing 62 and extending upward in front of the tractor's radiator and supported at the top by bearing 63 is a shaft 64 having the lever 60 fixed on the lower end and a lever 65 on the top end which is connected to the hand operated lever 66 by rod 67. The hand starting crank 68 is mounted on the shaft 69 which is carried in the bearing 70 and has a clutch member 71 made integral on the inside end which is held out of connection by spring 72. Fixed to clutch fork shaft 22 at the opposite end to the lever 59 is a lever 73 which extends upwards to the side of the worm wheel 42 and in the direct path of the lug 74 which is bolted to the worm wheel 42 at such a position as to push the lever and thus throw the hoisting clutch out of action when the implements have been hoisted to the proper height. It is now obvious that while the tractor's motor is running, the clutch shaft 14 is also in motion being driven through shaft 4 and gears 9 and 17. As it requires more power to lift the implements than to lower them, the lifting clutch members 19 and 23 have been made a larger diameter for lifting and with a larger gear reduction between the clutch and shaft 27 than is provided between the smaller clutch members 20 and 28 which are for lowering. It can be seen that by driving the shaft 27 through gears 25 and 26 the direction of rotation will be reversed as regards the direction of drive when driven by sprockets 29 and 30 through chain 31.

When it is desired to lift the implements at the rear of the tractor, the hand lever 66 is raised and thus through intermediate levers and connections the shifter fork 22 is rotated in its bearing forcing the clutch member 19 into member 23 by the yoke 21, setting the worm wheel 42 into rotation by gears 25 and 26, shaft 27, sprocket 35, chain 36, sprocket 37 and worm 34. The lug 74 is bolted to the side of the wheel 42 in such a place that when the chain drums have been rotated to the full lifted position, the lug pushes against lever 73 which in turn rotates the shifting fork 22 on its axis and forces clutches 19 and 23 out of action. To lower the implements, the hand lever 65 is pushed downwards thus engaging clutch members 20 and 28 and through sprockets 29 and 30 and chain 31 the worm is reversed and driven at a higher speed for lowering. When the worm wheel 42 has made nearly a complete revolution the lug 74 comes into contact with the other side of lever 73 and thus the lowering clutch is put out of action.

The gear case 12 which houses the clutches and gearing is partly filled with oil so that all important rapidly moving parts work in a bath of oil. The oil is kept from passing into the motor by means of an oil seal or gland 75.

Although I have described this particular form of gearing, chain drums, and other parts, I do not limit myself to this one method of accomplishing the same results.

What I claim as my invention and desire to secure by Letters Patent of the United States is:—

1. The combination with a tractor having a motor, a shaft driven by said motor and a tilling implement assembly hinged to the rear of said tractor, of a hoist for said implement assembly, said hoist comprising a housing, means for supporting said housing on the front of the tractor, a hoisting shaft carried by said housing, a drive shaft in said housing coupled to the tractor motor shaft, means in said housing operable at will for transmitting motion from said drive shaft to the hoisting shaft, and hoisting means on said hoisting shaft connected to said implement assembly.

2. The combination with a tractor having a motor, a shaft driven by said motor and a tilling implement assembly hinged to the rear of said tractor, of a hoist for said implement assembly comprising a housing, means for supporting said housing on the front of the tractor, a transverse hoisting shaft carried by the housing, a drive shaft in said housing coupled to the tractor motor shaft, means in said housing including a reversible drive for transmitting motion from said drive shaft to said hoisting shaft, and hoisting means carried by said hoisting shaft and connected to said implement assembly.

3. The combination with a tractor having a motor, a shaft driven by said motor and a tilling implement assembly hinged to the rear of said tractor, of a hoist for said implement assembly comprising an attachment, means for supporting said attachment on the front of said tractor, a hoisting shaft carried in a transverse horizontal position by said attachment, a drive shaft carried by said attachment and coupled to the tractor motor shaft, means carried by said attachment for transmitting motion from said drive shaft to said hoisting shaft, and hoisting means carried by said hoisting shaft and connected to said implement assembly.

4. The combination with a tractor having a motor, a shaft driven by said motor and a tilling implement assembly hinged to the rear of said tractor, of a hoist for said implement assembly comprising an attachment, means for supporting said attachment on the front of said tractor, a hoisting shaft carried in a transverse horizontal position by said attachment, a drive shaft carried by said attachment and coupled to the tractor motor shaft, means carried by said attachment and including a friction clutch-controlled reversible drive for transmitting motion from said drive shaft to said hoisting shaft, and hoisting means carried by said hoisting shaft and connected to said implement assembly.

5. The combination with a tractor having a motor, a shaft driven by said motor and a tilling implement assembly hinged to the rear of said tractor, of a hoist for said implement assembly comprising a hoisting shaft, means for supporting said hoisting shaft in a horizontal transverse position in front of said tractor's motor, hoisting means on said transverse shaft, a drive shaft coupled to the forward end of said motor shaft, a gear assembly between said hoisting shaft and said drive shaft, clutches interposed in said gear assembly, and manually operable means for operating said clutches to effect the drive of said hoisting shaft in either direction.

6. The combination with a tractor having a motor, a shaft driven by said motor and a tilling implement assembly hinged to the rear of said tractor, of a hoist for said implement assembly comprising a hoisting shaft, means for supporting said hoisting shaft in a horizontal transverse position in front of said tractor's motor, hoisting means on said transverse shaft, a drive shaft coupled to the forward end of said motor shaft, a gear assembly between said hoisting shaft and said drive shaft, clutches interposed in said gear assembly, manually operable means for operating said clutches to effect the drive of said hoisting shaft in either direction, and means for automatically throwing said clutches out of action when the implement assembly has been moved for a predetermined extent.

7. The combination with a tractor having a motor, of a hoist comprising a hoisting shaft, means for supporting said hoisting shaft in a horizontal transverse position in front of said tractor's motor in a plane perpendicular to that containing the axis of the motor shaft, hoisting means on said transverse shaft, a gear box coupled to the forward end of the tractor, a drive shaft coupled to the forward end of said motor shaft, a gear assembly between said hoisting shaft and said drive shaft, clutches interposed in said gear assembly, said drive shaft gear assembly and clutches being mounted in said gear box, and manually operable means for operating said clutches to effect the drive of said hoisting shaft in either direction.

8. The combination with a tractor having a motor, of a hoist comprising a hoisting shaft, means for supporting said hoisting shaft in a horizontal transverse position in front of said tractor's motor the axis of the hoisting shaft being perpendicular to the axis of the motor shaft, hoisting means on said transverse shaft, a gear box coupled to the forward end of the tractor, a drive shaft coupled to the forward end of said motor shaft, a gear assembly between said hoisting shaft and said drive shaft, clutches interposed in said gear assembly, said drive shaft gear assembly and clutches being mounted in said gear box, manually operable means for operating said clutches to effect the drive of said hoisting shaft in either direction, and means for automatically throwing said clutches out of action.

9. In a tractor hoist, a tractor, a motor on said tractor, a hoist, supporting means including a spigot centering connection between said tractor and said hoist, means comprising an irreversible worm gear drive for hoisting and holding a load, and a reversible drive for transmitting motion from said tractor motor to said worm gear drive.

10. In combination with a tractor having a motor, a hoist comprising a gear case mounted on said tractor, a clutch shaft mounted in said gear case, a driving gear mounted on said clutch shaft, a drive shaft mounted on said tractor, a driving pinion meshing with said driving gear mounted on said driving shaft, a floating driving connection between said motor and said driving shaft, means for holding said driving pinion and said driving gear in proper mesh comprising a spigot connection between said tractor and said gear case, clutches mounted on said clutch shaft, a worm shaft mounted in said gear case, an intermediate shaft mounted in said gear case, a reversible driving connection between said clutches and said intermediate shaft, a driving connection between said intermediate shaft and said worm shaft, a hoisting shaft mounted on said gear case, hoisting means mounted on said hoisting shaft, a worm gear connecting said hoisting shaft and said worm, manual means for actuating said clutches, and mechanical means for neutralizing said clutches comprising a lever operated by movement of said worm gear.

NORMAN CHOATE STOREY.